US012682346B1

(12) United States Patent
Ngene

(10) Patent No.: US 12,682,346 B1
(45) Date of Patent: Jul. 14, 2026

(54) ENCODING DATA STRUCTURES AS BIT PATTERN REPRESENTATIONS IN SMART CONTRACTS

(71) Applicant: Pacmodo Inc., Portland, OR (US)

(72) Inventor: David Ngene, Portland, OR (US)

(73) Assignee: Pacmodo Inc., Portland, OR (US)

( * ) Notice: Subject to any disclaimer, the term of this patent is extended or adjusted under 35 U.S.C. 154(b) by 0 days.

(21) Appl. No.: 19/402,886

(22) Filed: Nov. 26, 2025

(51) Int. Cl.
G06Q 20/38 (2012.01)
G06Q 20/36 (2012.01)
(52) U.S. Cl.
CPC ........... G06Q 20/389 (2013.01); G06Q 20/36 (2013.01)
(58) Field of Classification Search
CPC .............................. G06Q 20/389; G06Q 20/36
See application file for complete search history.

(56) References Cited

U.S. PATENT DOCUMENTS

| | | | | | |
|---|---|---|---|---|---|
| 5,265,204 | A | * | 11/1993 | Kimura | G06F 9/30038 |
| | | | | | 345/565 |
| 11,372,720 | B2 | * | 6/2022 | La Fetra | G06F 11/1048 |
| 11,636,008 | B2 | * | 4/2023 | Jeon | G06F 11/1004 |
| | | | | | 714/764 |
| 12,592,913 | B2 | * | 3/2026 | Gawde | H04L 9/3242 |
| 2016/0329097 | A1 | * | 11/2016 | Ordentlich | G06F 3/0638 |
| 2019/0102488 | A1 | * | 4/2019 | Santarone | G06Q 10/06 |
| 2020/0250033 | A1 | * | 8/2020 | Xie | G06F 12/023 |
| 2022/0004672 | A1 | * | 1/2022 | Santarone | G06T 19/006 |
| 2024/0004417 | A1 | * | 1/2024 | Pai | G02F 3/02 |

| | | | | |
|---|---|---|---|---|
| 2024/0236295 | A1 | * | 7/2024 | Martinelli | H04N 19/103 |
| 2025/0139207 | A1 | * | 5/2025 | Swarbrick | G06F 21/14 |
| 2025/0265600 | A1 | * | 8/2025 | Birnbaum | H04L 9/3213 |
| 2025/0392474 | A1 | * | 12/2025 | Gilchrist | H04L 9/3247 |
| 2026/0087488 | A1 | * | 3/2026 | Hancock, III | G06Q 20/3672 |

(Continued)

OTHER PUBLICATIONS

Metaverse Planet. (Nov. 14, 2024). Uniswap V3: A Beginner's Guide to Decentralized Trading. Metaverseplanet.net; Metaverse Planet. https://metaverseplanet.net/blog/uniswap-v3-a-beginners-guide-to-decentralized-trading/, 10 pages [retrieved on Dec. 5, 2025].

(Continued)

*Primary Examiner* — Patrick McAtee
*Assistant Examiner* — Md Sakib Hyder
(74) *Attorney, Agent, or Firm* — Perkins Coie LLP; Colin Fowler; Aidan Faustina

(57) ABSTRACT

Systems and methods for storing bit pattern representations of a data structure in a smart contract and performing algorithm identifying operations using the bit pattern representations are disclosed herein. In some embodiments, a data structure is encoded as a bit pattern representation using a predefined schema. A storage operation may then be performed to store the bit pattern representation and a schema identifier associated with the predefined schema within a smart contract. A request to determine an identity of an algorithm that generated a particular output may be received and the bit pattern representation may responsively be decoded from data stored in the smart contract to generate a set of data structure elements. A response may be provided to the request by performing zero-knowledge proof based on the set of data structure elements, a set of input values, and a set of output values.

20 Claims, 5 Drawing Sheets

(56)     References Cited

U.S. PATENT DOCUMENTS

2026/0094135 A1 *    4/2026   Chodroff ........... G06Q 20/0658

OTHER PUBLICATIONS

Overview. (2025). OpenZeppelin Docs. https://docs.openzeppelin.
com/contracts/5.x, 3 pages [retrieved on Dec. 5, 2025].
Introducing Ethscriptions | Ethscriptions. (Sep. 10, 2025). Ethscriptions.
com. https://docs.ethscriptions.com/, 4 pages [retrieved on Dec. 5,
2025].
Dilara Hatipoğlu. (Sep. 7, 2025). How the EVM Works. Medium;
CoinsBench. https://coinsbench.com/how-the-evm-works-
e5a866a0c9a5, 67 pages [retrieved on Dec. 5, 2025].

\* cited by examiner

Figure 2:
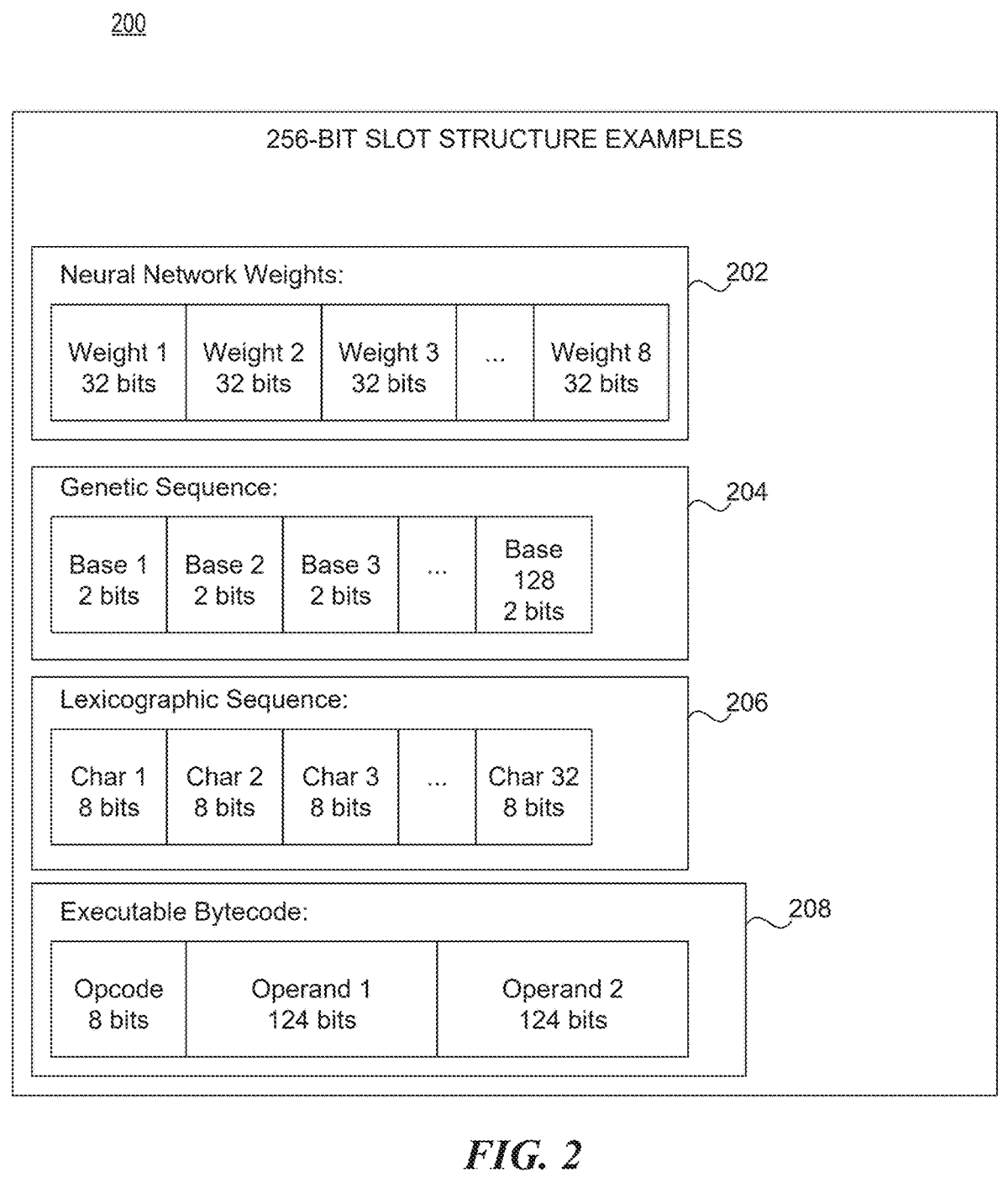

200

256-BIT SLOT STRUCTURE EXAMPLES

Neural Network Weights:                                          202

| Weight 1 32 bits | Weight 2 32 bits | Weight 3 32 bits | ... | Weight 8 32 bits |
|---|---|---|---|---|

Genetic Sequence:                                               204

| Base 1 2 bits | Base 2 2 bits | Base 3 2 bits | ... | Base 128 2 bits |
|---|---|---|---|---|

Lexicographic Sequence:                                         206

| Char 1 8 bits | Char 2 8 bits | Char 3 8 bits | ... | Char 32 8 bits |
|---|---|---|---|---|

Executable Bytecode:                                            208

| Opcode 8 bits | Operand 1 124 bits | Operand 2 124 bits |
|---|---|---|

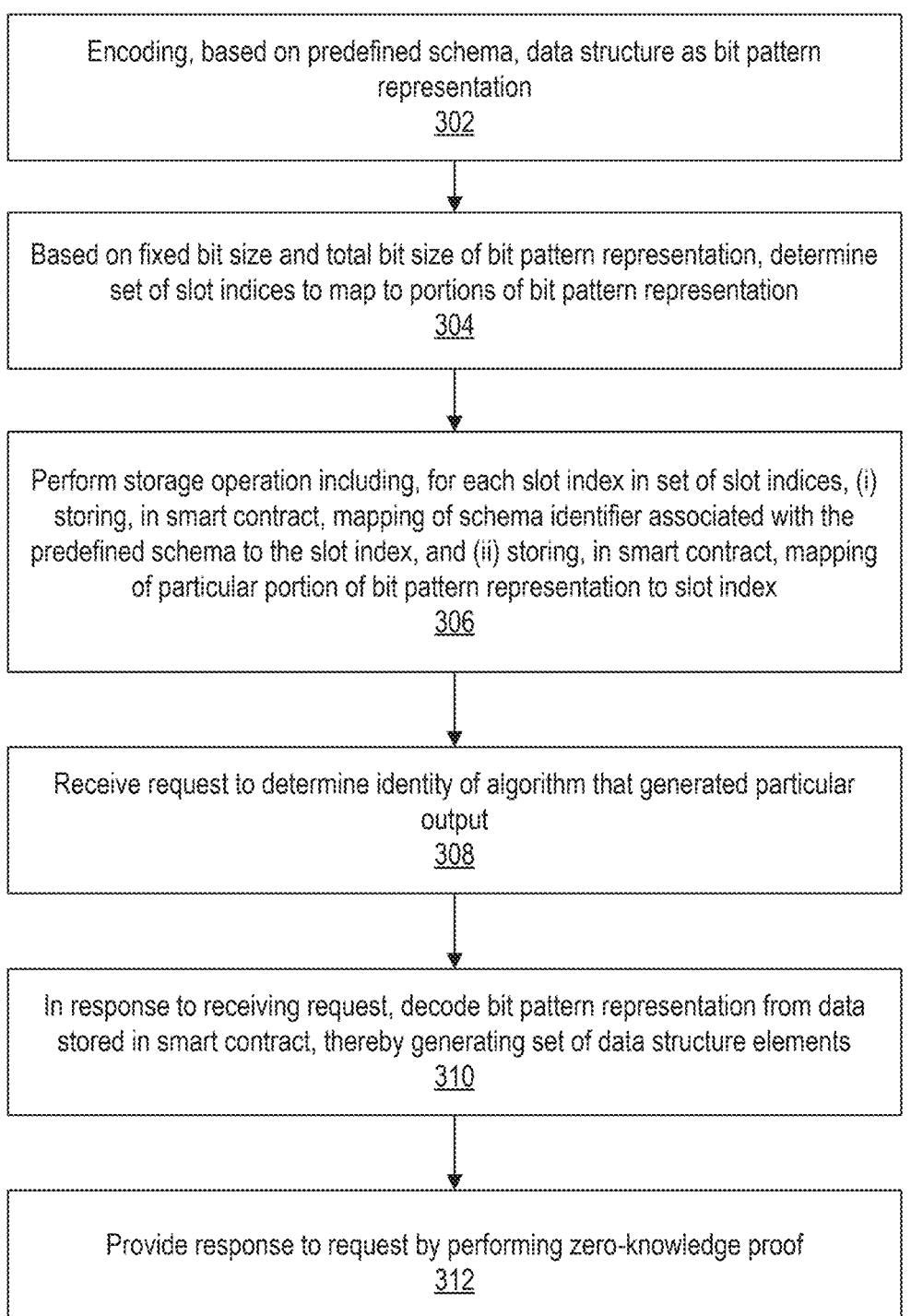

Encoding, based on predefined schema, data structure as bit pattern representation
302

Based on fixed bit size and total bit size of bit pattern representation, determine set of slot indices to map to portions of bit pattern representation
304

Perform storage operation including, for each slot index in set of slot indices, (i) storing, in smart contract, mapping of schema identifier associated with the predefined schema to the slot index, and (ii) storing, in smart contract, mapping of particular portion of bit pattern representation to slot index
306

Receive request to determine identity of algorithm that generated particular output
308

In response to receiving request, decode bit pattern representation from data stored in smart contract, thereby generating set of data structure elements
310

Provide response to request by performing zero-knowledge proof
312

ENCODING DATA STRUCTURES AS BIT PATTERN REPRESENTATIONS IN SMART CONTRACTS

BACKGROUND

A blockchain is a decentralized, distributed digital ledger that records transactions across a network of computers in a way that enables secure, transparent, and tamper-resistant storage of data. Each record on a blockchain is called a "block" and is linked to the previous record, creating an immutable "chain" of transactions. Blockchains are well known for supporting the transaction records of cryptocurrency systems. When operations are performed on a blockchain, nodes of the blockchain network execute consensus protocols to validate the operation and permit the addition of new blocks to the blockchain.

Ethereum is a specific blockchain platform designed to support not only a native cryptocurrency (Ether or ETH), but also programmable applications called "smart contracts." Launched in 2015, Ethereum allows developers to build decentralized applications (dApps) that run on its blockchain, enabling a wide range of uses such as decentralized finance (DeFi), non-fungible tokens (NFTs), and more. Other blockchain platforms, or simply "blockchains," such as Solana and Avalanche, also include similar features to Ethereum, enabling smart contracts and NFTs to be implemented on the platforms.

Some blockchains are compatible with a second layer of protocols/networks being built on top of the base blockchain itself (e.g., Optimistic Rollups, zkRollups, Arbitrum, Polygon). This second layer, often referred to as "Layer 2," may improve scalability and reduce transaction costs for a blockchain system, as processes can be computed with more efficiency on Layer 2 than on the base blockchain, which may be referred to as "Layer 1." Many Layer 2 systems periodically communicate results back to Layer 1, which remains responsible for core blockchain functions such as transaction validation, security, and decentralization.

BRIEF DESCRIPTION OF THE DRAWINGS

Detailed descriptions of implementations of the present invention will be described and explained through the use of the accompanying drawings.

FIG. 2 depicts several example usages of a bit pattern encoding environment to encode various data structures in one or more 256-bit slots, in accordance with some embodiments of the present technology.

FIG. 3 is a flow diagram illustrating an example method of encoding data structures as bit pattern representations in smart contracts and providing verifiable algorithm identification through zero-knowledge proofs, in accordance with some embodiments of the present technology.

Figure 1:
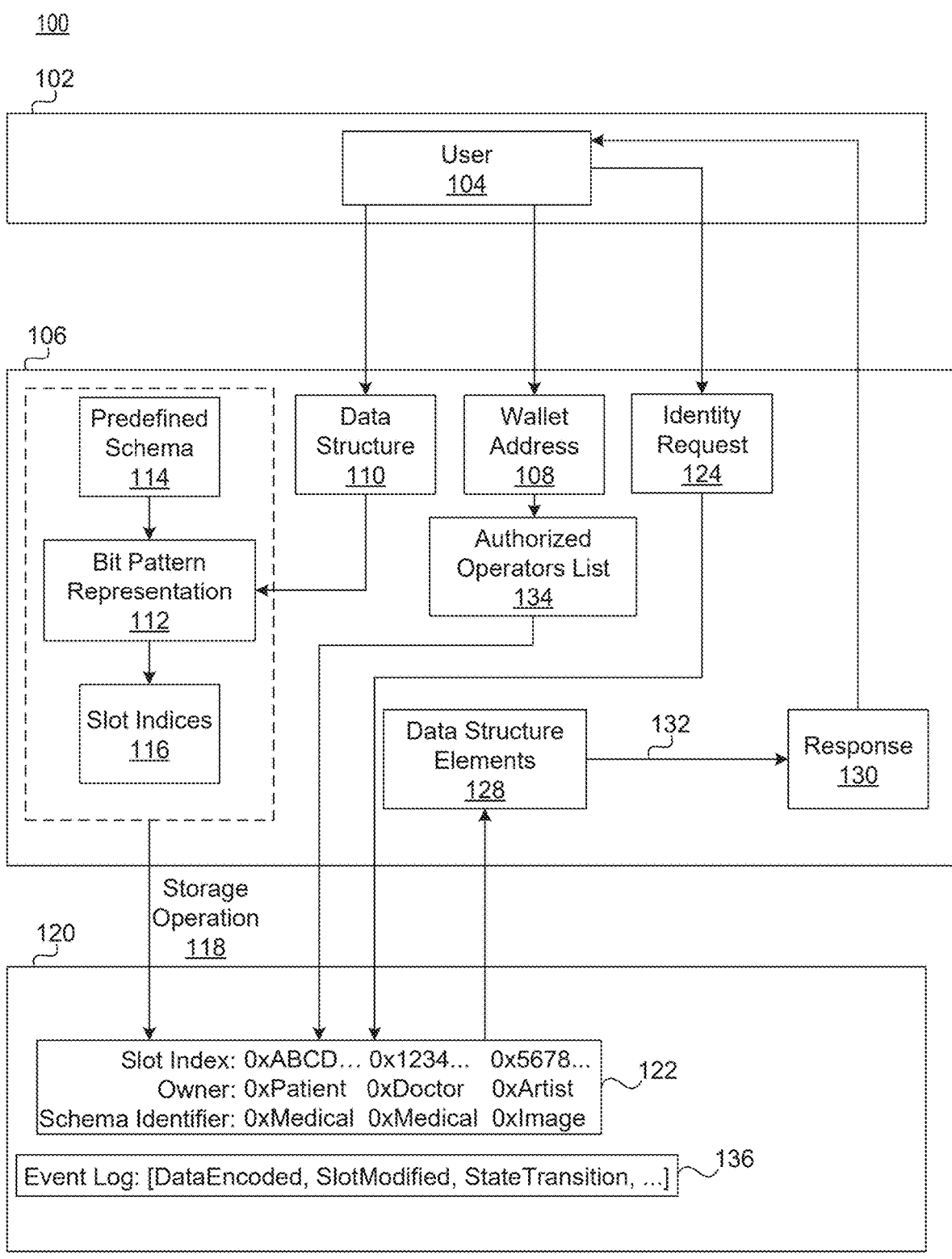
FIG. 1 is an example bit pattern encoding environment for recording data structures as bit pattern representations in a smart contract, in accordance with some embodiments of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Many blockchain systems face limitations in storing and managing complex data structures on-chain due to high computational costs and technical complexity associated with blockchain storage operations. Some existing blockchain storage systems exist for storing arbitrary data directly on a blockchain, but these systems may rely on transaction calldata that is subject to pruning (e.g., in an Ethereum blockchain, which allows pruning of certain historical calldata), creating uncertainty about data permanence. Other solutions that do enable more permanent data storage may have strict size limitations that prevent storage of large data structures, may use computationally costly read/write operations, and/or may not provide controllable access to retrieving and modifying stored data. These limitations result in users seeking the benefits of blockchain storage (e.g., immutable transaction history, decentralized storage) having to perform expensive/complex computational operations, risk pruning of valuable data, and/or forego the ability to readily edit and control access to stored data. Furthermore, existing solutions may not include mechanisms for comparing the identity of data structures stored within the blockchain data structures stored off-chain without revealing some or all of the data structure itself, which may result in the undesirable disclosure of confidential information included in the data structure.

The present technology addresses these limitations through a blockchain-based data storage system that encodes data structures as bit pattern representations in smart contracts, leveraging the decentralization and verifiability of blockchain storage while using smart contract storage that is not subject to pruning, has relatively low computational costs, and may be modified after being initially written. The present technology may encode a data structure as a bit pattern representation, where the bit pattern representation is a numerically-based memory image (e.g., a binary representation, a hexadecimal representation) of the data structure stored in one or more slots having a fixed bit size. The predefined schema may be an algorithm for converting between the original data structure and its bit pattern representation. An application layer may perform a storage operation that stores mappings of both a schema identifier and particular portions of the bit pattern representation to indices of various slots, which serve as individual units of storage for the memory image, within a smart contract associated with a blockchain. This approach enables slot-based storage mechanisms that can flexibly be used to store and decode data structures of various types according to an applicable schema. For example, complex data structures such as neural network model weights, genetic sequences, lexicographic sequences (e.g., sentences, symbolic codes), and executable bytecode may be stored in the smart contract. Using the smart contract for storage reads/writes as described herein provides a more efficient source of memory than direct blockchain reads/writes, which are immutable and are more computationally expensive. Additionally, because these data structures may include sensitive data, the present technology may provide access control mechanisms that allow modifications to the bit pattern representations of these data structures to be performed, but only after verifying that a cryptographic wallet address associated with the modification is associate with an authorized operator approved for access.

Furthermore, the application layer may process requests to determine an identity of an algorithm by comparing that algorithm to data structures represented within the smart contract using zero-knowledge proofs that confirm or deny whether the algorithm is identical to a given data structure. Because zero-knowledge proofs do not reveal information about the compared data structures themselves, the application layer may improve upon existing solutions by identifying algorithms without revealing potentially sensitive data about data structures being compared to those algorithms.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.
Token Batching Environment FIG. 1 is an example bit pattern encoding environment 100 for recording data structures as bit pattern representations in a smart contract, in accordance with some embodiments of the present technology. The bit pattern encoding environment 100 includes a user layer 102, a user 104, an application layer 106, a wallet address 108, a data structure 110, a bit pattern representation 112, a predefined schema 114, a set of slot indices 116, a storage operation 118, a blockchain layer 120, a smart contract 122, an identity request 124, a set of data structure elements 128, a response 130, a zero-knowledge proof 132, an authorized operators list 134, and an event log 136. It will be appreciated, however, that some implementations of the bit pattern encoding environment 100 may include different and/or additional components or may include components connected in different ways.

The bit pattern encoding environment 100 may include a user layer 102 that includes one or more users (e.g., a user 104) that may interact with an application layer 106. The user 104 is an individual or entity with communicative access to the application layer 106, which is a combination of hardware and/or software for encoding one or more data structures to be stored on one or more blockchains. The application layer 106 may include a standalone software application and/or an application integrated into Layer 1 or Layer 2 of a blockchain, such as a smart contract. As depicted in FIG. 1, the user 104 is associated with a wallet address 108, which is a cryptographic address of a cryptographic wallet associated with the user 104 that is received by (e.g., actively acquired by or passively transmitted to) the application layer 106. Also as depicted, the smart contract layer 106 receives a data structure 110 from the user 104. The data structure 110 is a collection of data that may be encoded, by the smart contract layer 106, as a bit pattern representation 112. A bit pattern representation 112 is a numerically-based memory image of the data structure 110, meaning that the bit pattern representation 112 encodes the same information as the data structure 110 using a positional numeral system (e.g., binary, hexadecimal, decimal) and a predefined schema 114 that describes a process for conversion between the information as represented values in the positional numeral system and the original format of the information within the data structure 110. In some embodiments, the bit pattern representation 112 is stored in one or more slots, which are strings, arrays, or sets of characters having a fixed bit size (e.g., containing a number of bits of information equal to the fixed bit size) that act as individual units of memory for the memory image. For example, where the fixed bit size is 256 bits, each slot may contain 256 bits of memory for encoding the bit pattern representation 112. Further examples of possible data structures, bit pattern representations, and predefined schema are provided in relation to FIG. 2 below.

In some embodiments, the application layer 106 determines a set of slot indices 116 to map to portions of the bit pattern representation 112. Each slot index from the set of slot indices 116 is a numerical identifier that may be assigned to a slot, enabling slots to be searched for and distinguished from one another. In some embodiments, the set of slot indices 116 is based on the fixed bit size and a total bit size of the bit pattern representation 112 (e.g., the total number of bits of information stored in the bit pattern representation 112). For example, dividing the total bit size by the fixed bit size and rounding the result up to the nearest integer yields a minimum number of slots in which the bit pattern representation 112 may be stored in its entirety, and the set of slot indices 116 may be generated to include a number of slot indices equal to that minimum number (e.g., so that each slot necessary for storing the bit pattern representation 112 may have a corresponding slot index).

In some embodiments, the application layer 106 performs a storage operation 118, which is the execution of one or more computer-implemented instructions to store information in a blockchain layer 120. The blockchain layer 120 includes a blockchain having smart contract functionality (e.g., Ethereum, Solana, Avalanche) and may include a Layer 2 network (e.g., Optimistic Rollups, zkRollups, Arbitrum, Polygon) built on that blockchain, which serves as a Layer 1. For example, the storage operation 118 may include performing two storage steps for each slot index in the set of slot indices 116. First, for a particular slot index, a mapping of a schema identifier (e.g., an alphanumeric code or positional numeral system value uniquely identifying the predefined schema 114) associated with the predefined schema 114 to the particular slot index is stored in a smart contract 122. Second, for the particular slot index, a mapping of a particular portion of the bit pattern representation 112 to the particular slot index is stored in the smart contract 122. The particular portion may include a first number of bits less than or equal to the fixed bit size, thereby allowing the particular portion to be fully stored within a single slot identified by the particular slot index.

The smart contract 122 may be a smart contract application built using protocols of the blockchain and stored in either Layer 1 or Layer 2 storage within the blockchain layer 120. Each of the mappings may be a data structure including one or more key-value pairs (e.g., an array, a Map object in JavaScript) that may be written to the smart contract 122 (e.g., using an SSTORE operation or another modification of the state storage of the smart contract 122), thereby storing a record of an association between the particular slot index, the schema identifier, and the particular portion of the bit pattern representation 112 on the blockchain. In some embodiments, upon performing the storage operation 118, the application layer 106 records a version identifier associated with the data structure 110 to the blockchain (e.g., on either Layer 1 or Layer 2), enabling a current version of the data structure 110 that is represented within the smart contract 122 to be tracked. In some embodiments, the smart contract 122 is implemented on Layer 2 and the cheaper storage read/write operations of Layer 2 may be used to perform the above storage operations and/or access the stored data, with only specific data such as state roots being communicated to Layer 1. Thus, the smart contract 122 may operate as a more efficient memory system than other solutions which perform more storage read/write operations directly on Layer 1.

In some embodiments, the application layer 106 receives an identity request 124 (e.g., from the user 104, as depicted in FIG. 1, or another individual/entity). The identity request 124 may be a request to determine an identity of an algorithm that generated a particular output. For example, the algorithm may be a machine learning (ML) model (e.g., a neural network, a clustering algorithm, a language model, a regression model, and/or the like) and the user 104 may be attempting to determine a particular version of the model (e.g., an instance of the model having a particular set of weights) that generated the particular output. The application layer 106 may, in such embodiments, decode information from the smart contract 122 to determine whether the algorithm is the data structure 110 for which the bit pattern representation 112 has been stored.

In some embodiments, the identity request 124 includes a set of input values, which are a set of inputs that may have been provided to the algorithm, and a set of output values, which are a set of outputs that may have been generated by the algorithm in response to the set of input values. In such embodiments, in response to receiving the identity request 124, the bit pattern representation 112 may be decoded from data stored in the smart contract 122. Decoding the bit pattern representation 112 may generate a set of data structure elements 128, which are individual portions of the data structure 110 representing defining characteristics of the data structure 110. For example, where the data structure 110 is an ML algorithm, each data structure element from the set of data structure elements 128 may be a model weight, as the combination of these weights is a necessary component of completely defining the ML algorithm.

The application layer 106 may track the set of slot indices 116 such that each slot index therein is known to correspond to a particular portion of the bit pattern representation 112. Based on this tracking, the application layer 106 may decode the data associated with each slot index from the set of slot indices 116 and not other slot indices, enabling the bit pattern representation 112 to be decoded without expending excess computational resources on decoding unrelated data in the smart contract 122. In some embodiments, this tracking is performed by, for the particular portion of the bit pattern representation 112 mapped to each slot index in the set of slot indices 116, storing a mapping of the particular portion to the wallet address 108, thereby creating an association between each of the particular portions of the bit pattern representation 112 and the user 104. In such embodiments, when the identity request 124 is received from the user 104, the application layer 106 may decode the bit pattern representation 112 by retrieving, using the wallet address 108, the bit pattern representation 112 from the smart contract 122, as each portion of the bit pattern representation 112 is mapped to the wallet address 108. Additionally, a mapping of the schema identifier to the wallet address 108 may be stored in the smart contract 122 and, in response to receiving the identity request 124 from the user 104, the schema identifier may also be retrieved from the smart contract 122 using the wallet address 108. Thus, the application layer 106 may identify, based on the schema identifier and its association with the same wallet address 108 as the bit pattern representation 112, that applying the predefined schema 114 to the bit pattern representation 112 will decode the bit pattern representation 112 into the data structure 110.

Once the bit pattern representation 112 is decoded into the set of data structure elements 128, the application layer 106 may provide a response 130 to the identity request 124 (e.g., by transmitting the response 130 to the user 104). The response 130 is an indication of whether the application layer 106 identified a data structure encoded in the smart contract 122 that corresponds to the algorithm which generated the output associated with the identity request 124 and/or an indication of an identity of that algorithm. For example, where the data structure 110 is determined, by the application layer 106, to be the algorithm, the response 130 may include a name, a version number, and/or another identifier of the data structure 110 as the identity of the algorithm.

In some embodiments, the response 130 is provided by performing a zero-knowledge proof 132 that is based on the set of data structure elements 128, the set of input values from the identity request 124, and the set of output values from the identity request 124. The zero-knowledge proof 132 is a protocol by which the application layer 106 may demonstrate to the user 104 or another third party that a given statement is true without conveying any information beyond the fact of the statement's truth. In the context of FIG. 1, the zero-knowledge proof 132 is used to demonstrate the truth or falsity of a statement that the data structure 110 is the algorithm associated with the identity request 124 in a manner that is verifiable but does not reveal any additional information (e.g., particular weights of a model where the data structure 110 is an ML algorithm). For example, the zero-knowledge proof 132 may be a Succinct Non-Interactive Arguments of Knowledge (SNARK) proof, a Scalable Transparent Argument of Knowledge (STARK) proof, a Verifiable Polynomial Delegation (VPD) proof, a Succinct Non-interactive Arguments (SNARG) proof, and/or another form of zero-knowledge proof. In some embodiments, the zero-knowledge proof 132 includes the application layer 106 (1) computing a hash by providing the set of data structure elements 128, the set of input values, and the set of output values as input to a hash function and (2) comparing the hash to a second hash generated by the user 104 using the same hash function to determine whether the hashes are identical. So long as the number of potential outputs of the hash function is sufficiently large, the probability of the user 104 generating the same hash as the application layer 106 without also using the same inputs to the hash function is a near impossibility. Thus, the comparison effectively demonstrates whether the algorithm accessed by the user 104 and associated with the identity request 124 is the data structure 110, since the user 104 and application layer 106 would be extremely unlikely to use the same sets of data structure elements, inputs, and outputs as input to the hash function unless the data structure 110 and the algorithm were identical. Furthermore, by performing comparisons using the zero-knowledge proof 132, the data structure 110 will not be revealed to the user 104 where it does not match the identity of the algorithm, enabling comparisons to data stored within the smart contract 122 without risking revealing that data to the user 104, who may not be authorized to access the data.

In some embodiments, the application layer 106 includes security functionality regarding modifications to the bit pattern representation 112, enabling access control for the smart contact 122 in addition or as an alternative to the algorithm identification features described above. For example, the wallet address 108 may be stored within an authorized operators list 134 that is itself stored by the application layer 106 in the smart contract 122. The authorized operators list 134 may indicate a set of cryptographic wallet addresses having permission to modify the bit pattern representation 112, thereby allowing the application layer 106 to limit modification access to the bit pattern representation 112 to particular users associated with those addresses. Continuing with the same example, the application layer 106 may receive a modification to the bit pattern representation 112 (e.g., a specification of one or more bits/numeral in the bit pattern representation 112 to change), with the modification being associated with the wallet address 108 (e.g., by being received from the user 104, who is associated with the wallet address 108). Again continuing with the same example, upon determining that the wallet address 108 is included in the set of cryptographic wallet addresses of the authorized operator list 134, the application layer 106 may modify one or more mappings stored in the smart contract 122 to reflect the modification (e.g., to encode a modified version of the bit pattern representation 112 in those mappings), improving security of the data stored in the smart contract 122 by limiting modifications of that data to trusted users. In some embodiments where one or more mappings are modified, a version identifier associated with the data structure 110 that is recorded on the blockchain is modified to reflect the modification, thereby updating the record of the current version of the data structure 110 that is stored on the blockchain to match the version now encoded therein.

In some embodiments, the blockchain layer includes an event log 136, which is an immutable record of the storage operation 118 and which may be recorded to the blockchain (e.g., on either Layer 1 or Layer 2) by the application layer 106. The event log 136 may include the set of slot indices 116 and/or other data related to the storage operation 118, such as one or more portions of the bit pattern representation 112, a timestamp for the storage operation 118, the predefined schema 114, and the like. The event log 136 may include the set of slot indices 116 to enable a listener to reconstruct the data structure 110 based on the event log 136. A listener is a computing device comprising one or more software and/or hardware components (e.g., the components of the computer system 500 as described in relation to FIG. 5 below) that listens for events on the blockchain to decode information stored thereon. Since the listener may determine the set of slot indices 116 from the event log 136, where the listener also has access to (1) the slots and (2) the predefined schemas that have been encoded to the smart contact 122 by the application layer 106, the listener can look up each of the slots including the portions of the bit pattern representation 112 and the predefined schema 114, as all of this information is mapped to at least one slot index from the set of slot indices.

As an example, the application layer 106 may generate a schema registry including the predefined schema 114 and the schema identifier and transmit that schema registry to the listener. The listener may then reconstruct the data structure 110 by (1) identifying the predefined schema 114 based on the set of slot indices 116 (as included in the event log 136) and the schema registry and (2) applying the predefined schema 114 to portions of the bit pattern representation 112 to which the set of slot indices 116 are mapped. The portions of the bit pattern representation 112 may be read from the smart contract 122 directly or a copy of each slot including the portions may be sent to the listener (e.g., by the application layer 106). Transmitting certain information to the listener independently of the blockchain while still transmitting the set of slot indices 116 via the event log 136 uses fewer computational resources that storing all the necessary information for decoding the data structure 110 directly on the blockchain (e.g., because blockchain operations require additional computational overhead for consensus validation, gas payments, and/or the like) but still leverages the immutable nature of the event log 136 to reduce the likelihood of inaccurate information being provided to the listener that causes the data structure 110 to be reconstructed incorrectly.

FIG. 2 depicts several example usages 200 of a bit pattern encoding environment (e.g., the bit pattern encoding environment 100 described in relation to FIG. 1 above) to encode various data structures in one or more 256-bit slots, in accordance with some embodiments of the present technology. FIG. 2 includes a neural network example 202, a genetic sequence example 204, a lexicographic sequence example 206, and an executable bytecode example 208, with each example including a depiction of how a single slot from the one or more 256-bit slots may be structured. 256 bits may be chosen as the fixed bit size for each slot because 256 is evenly divisible by several numbers that are commonly used for bit encodings (e.g., 2, 8, 32). However, the present invention is not so limited; other data structures may be encoded and/or other fixed bit sizes for the slots may be used.

In the neural network example 202, the data structure encoded in the one or more slots is a set of model weights for a neural network and/or another ML algorithm. As depicted, each weight of the set of model weights is encoded in 32 bits, meaning that an encoding for 8 model weights can be stored in a single slot. In the neural network example 202, because each weight is encoded in 32 bits, the predefined schema used to encode/reconstruct the data structure may be an algorithm for converting between individual weights and 32-bit portions of a bit pattern representation. For example, each weight may be a number represented as a decimal and the algorithm may include shifting each weight from the set of model weights by a number of bit positions equal to 32 multiplied by an index of the weight within the set of model weights. For example, where the set of model weights includes 8 weights, the weights may be indexed with the numbers 0-7, respectively. This algorithm effectively converts each decimal into a hexadecimal representation and then locates that representation within the slot such that the representation does not overlap with/replace the representations of any other weights. Reversing this algorithm enables the original data structure to be reconstructed (e.g., by converting each 32-bit hexadecimal representation back into a decimal representation of a weight).

In the genetic sequence example 204, the data structure encoded in the one or more slots is a set of nucleotide bases (e.g., adenine (A), cytosine (C), guanine (G), thymine (T)) from a genetic sequence. As depicted, each nucleotide base of the set of nucleotide bases is encoded in 2 bits, meaning that an encoding for 128 nucleotide bases can be stored in a single slot. In the genetic sequence example 202, because each weight is encoded in 2 bits, the predefined schema used to encode/reconstruct the data structure may be an algorithm for converting between individual nucleotide bases and 2-bit portions of a bit pattern representation. For example, each nucleotide base may be mapped to a particular 2-bit code (e.g., A=00, T=01, C=10, G=11), as only 2 bits are necessary to encode 4 distinct possibilities, representing the 4 possible nucleotide bases in deoxyribonucleic acid (DNA). Continuing with the same example, the algorithm may convert each occurrence of the letters A, T, C, and G in a genetic sequence into each letter's corresponding 2-bit code. Reversing this algorithm enables the original data structure to be reconstructed (e.g., by converting each 2-bit code back into a letter representing a particular nucleotide base).

In the lexicographic sequence example 206, the data structure encoded in the one or more slots is a lexicographic sequence, which is a sequence of characters (e.g., numbers, letters, mathematical symbols, punctuation) used in writing. As depicted, each character of the lexicographic sequence is encoded in 8 bits, meaning that an encoding for 32 characters can be stored in a single slot. In the lexicographic sequence example 202, because each character is encoded in 8 bits, the predefined schema used to encode/reconstruct the data structure may be an algorithm for converting between individual characters and 8-bit portions of a bit pattern representation. For example, each character may be mapped to a particular 8-bit code (e.g., according to the American Standard Code for Information Interchange (ASCII) encoding standard). Continuing with the same example, the algorithm may convert each character into a corresponding 8-bit code, convert each 8-bit code into binary, and store a string of each of the binary representations as the bit pattern representation. Reversing this algorithm enables the original data structure to be reconstructed (e.g., by converting each 8-bit grouping in the binary string back into an 8-bit code and then into a character).

In the executable bytecode example 208, the data structure encoded in the one or more slots includes an 8-bit opcode, which is value specifying a particular computer operation to be performed, and a set of operands associated with the opcode, where each operand in the set of operands is a datum upon which the operation specified by the opcode may act. The opcode and/or the operands may be specified by a particular bytecode language (e.g., Java bytecode, Microsoft® P-Code). As depicted, the opcode is encoded as the leftmost 8 bits of a slot and the set of operands is encoded in the remaining 248 bits, with 2 operands being represented in 124 bits each. In the executable bytecode example 208, the predefined schema used to encode/reconstruct the data structure may be an algorithm for (1) encoding the opcode as a leftmost 8 bits of a bit pattern representation and (2) encoding the set of operands as a remaining 248 bits of the bit pattern representation. The set of operands may be encoded by the algorithm by (1) determining a bit size equal to 248 divided by a number of operands in the set of operands and (2) encoding each operand from the set of operands in the bit pattern representation using a second number of bits equal to the bit size, which may divide the available bits in the bit pattern representation evenly between the encodings for each operand from the set of operands. Reversing this algorithm enables the original data structure to be reconstructed (e.g., by converting the first 8 bits of the bit pattern back into the opcode and converting evenly divided groupings of the remaining bits back into operands).

Example Method Flow

FIG. 3 is a flow diagram illustrating an example method 300 of encoding data structures as bit pattern representations in smart contracts and providing verifiable algorithm identification through zero-knowledge proofs, in accordance with some embodiments of the present technology. In some embodiments, the method 300 is performed by components of the example computer system illustrated and described in more detail in relation to FIG. 5 below and/or the bit pattern encoding environment 100 described in relation to FIG. 1 above. Likewise, embodiments may include different and/or additional operations or may perform the operations in different orders.

In operation 302, a data structure is encoded, based on a predefined schema, as a bit pattern representation. The bit pattern representation may be a numerically-based memory image of the data structure and may be stored in one or more slots having a fixed bit size. The data structure may be the same as or generally similar to the data structure 110 as described in relation to FIG. 1 above. The predefined schema may be the same as or generally similar to the predefined schema 114 as described in relation to FIG. 1 above. The bit pattern representation may be the same as or generally similar to the bit pattern representation 112 as described in relation to FIG. 1 above. The one or more slots may have a fixed bit size such as 256 bits, enabling standardized storage and retrieval operations. In some embodiments, the data structure is a set of model weights, and the predefined schema is an algorithm for converting between individual weights and 32-bit portions of the bit pattern representation. In such embodiments, the algorithm may include shifting each weight from the set of model weights by a number of bit positions equal to 32 multiplied by an index of the weight within the set of model weights. In other embodiments, the data structure includes an 8-bit opcode and a set of operands associated with the opcode and the total bit size is 256 bits. In such embodiments, the predefined schema may be an algorithm that encodes the 8-bit opcode as a leftmost 8 bits of the bit pattern representation and the set of operands as a remaining 248 bits of the bit pattern representation by (1) determining a bit size equal to 248 divided by a number of operands in the set of operands and (2) encoding each operand from the set of operands in the bit pattern representation using a second number of bits equal to the bit size. The data structure may alternatively be a set of nucleotide bases from a genetic sequence, and the predefined schema may be an algorithm for converting between individual nucleotide bases and 2-bit portions of the bit pattern representation. In yet other embodiments, the data structure is a lexicographic sequence, and the predefined schema is an algorithm for converting between individual characters in the lexicographic sequence and 8-bit portions of the bit pattern representation.

In operation 304, a set of slot indices is determined to map to portions of the bit pattern representation, based on the fixed bit size and a total bit size of the bit pattern representation. The set of slot indices may be the same as or generally similar to the set of slot indices 116 as described in relation to FIG. 1 above. The total bit size represents the complete size of the encoded data structure, and dividing the total bit size by the fixed bit size determines the minimum number of slots required for storage of the bit pattern representation.

In operation 306, a storage operation is performed including, for each slot index in the set of slot indices, (1) storing, in a smart contract, a mapping of a schema identifier associated with the predefined schema to the slot index and (2) storing, in the smart contract, a mapping of a particular portion of the bit pattern representation to the slot index. The smart contract may be associated with a blockchain and/or the particular portion may include a first number of bits less than or equal to the fixed bit size. The smart contract may be the same as or generally similar to the smart contract 122 as described in relation to FIG. 1 above. The schema identifier may be an alphanumeric code or positional numeral system value that uniquely identifies the predefined schema. The particular portion represents a segment of the bit pattern representation that may be fully contained within a single slot.

In some embodiments, the data structure is received from a user associated with a cryptographic wallet address, a mapping of the schema identifier to the cryptographic wallet address is stored in the smart contract, and, for each slot index in the set of slot indices, a mapping of the particular portion of the bit pattern representation to the cryptographic wallet address is stored in the smart contract. The cryptographic wallet address may be the same as or generally similar to the wallet address 108 as described in relation to FIG. 1 above. Additionally or alternatively, the cryptographic wallet address may be stored within a list of authorized operators in the smart contract. The list of authorized operators may indicate a set of cryptographic wallet addresses having permission to modify the bit pattern representation. A modification to the bit pattern representation may be received that is associated with a second cryptographic wallet address, and, upon determining that the second cryptographic wallet address is included in the set of cryptographic wallet addresses, one or more mappings stored in the smart contract may be modified to reflect the modification. The list of authorized operators may be the same as or generally similar to the authorized operators list 134 as described in relation to FIG. 1 above. Upon performing the storage operation, a version identifier associated with the data structure may be recorded to the blockchain, and upon modifying the one or more mappings, the version identifier may be updated to reflect the modification.

In operation 308, a request is received to determine an identity of an algorithm that generated a particular output. The request may be the same as or generally similar to the identity request 124 as described in relation to FIG. 1 above. For example, the request may include a set of input values, which are a set of inputs that may have been provided to the algorithm, and a set of output values, which are a set of outputs that may have been generated by the algorithm in response to the set of input values. The algorithm may be a computational process that may have been used to generate the particular output from the set of input values.

In operation 310, in response to receiving the request, the bit pattern representation is decoded from data stored in the smart contract, thereby generating a set of data structure elements. The set of data structure elements may be the same as or generally similar to the set of data structure elements 128 as described in relation to FIG. 1 above. The decoding process may reverse the encoding operation to reconstruct components of the original data structure. In some embodiments, in response to receiving the request from the user, the bit pattern representation is decoded by retrieving, using the cryptographic wallet address, the bit pattern representation and the schema identifier from the smart contract, and based on the schema identifier, applying the predefined schema to the bit pattern representation.

In operation 312, a response is provided to the request by performing a zero-knowledge proof. The zero-knowledge proof may be based on the set of data structure elements, the set of input values, and the set of output values, and the response may include the identity of the algorithm. The zero-knowledge proof may be the same as or generally similar to the zero-knowledge proof 132 as described in relation to FIG. 1 above. The response may be the same as or generally similar to the response 130 as described in relation to FIG. 1 above.

In some embodiments, an event log is recorded to the blockchain (e.g., in response to performing the storage operation). The event log may be an immutable record of the storage operation that includes the set of slot indices, thereby enabling a listener to reconstruct the data structure based on the event log. The event log may be the same as or generally similar to the event log 136 as described in relation to FIG. 1 above. A schema registry including the predefined schema and the schema identifier may be generated and transmitted to the listener, and the listener may reconstruct the data structure by (1) identifying the predefined schema based on the set of slot indices included in the event log and the schema registry and (2) applying the predefined schema to the portions of the bit pattern representation to which the set of slot indices are mapped.

Decentralized Blockchain Environment

Figure 4:
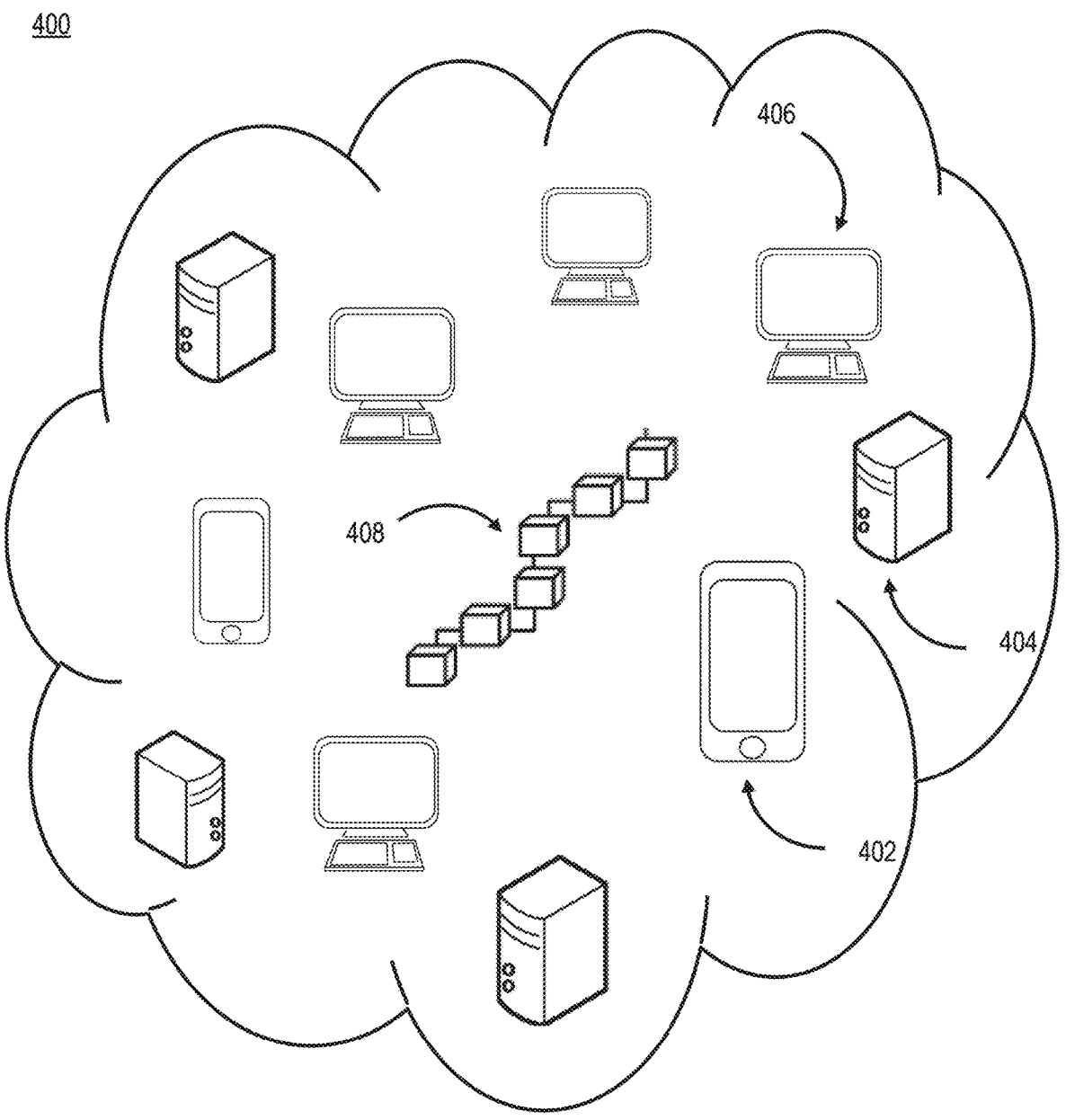
FIG. 4 shows an illustrative diagram for a decentralized environment for performing blockchain functions or operations, in accordance with some embodiments of the present technology.

FIG. 4 shows an illustrative diagram for a decentralized environment 400 for performing blockchain functions or operations, in accordance with some embodiments of the present technology. For example, the diagram presents various components that may be used to allocate and distribute cryptographic resources in response to an off-chain trigger or event upon request in some embodiments.

As shown in FIG. 4, the decentralized environment 400 may include multiple user devices (e.g., user device 402, user device 404, and/or user device 406). For example, the decentralized environment 400 may include a distributed state machine in which each of the components in FIG. 4 acts as a client of the decentralized environment 400. For example, the decentralized environment 400 (as well as other systems described herein) may include a large data structure that holds not only all accounts and balances but also a state machine that may change from block to block according to a predefined set of rules and that may execute arbitrary machine code. The specific rules of changing state from block to block may be maintained by a virtual machine (e.g., a computer file implemented on and/or accessible by a user device, which behaves like an actual computer) for the system. For example, the decentralized environment 400 may interact with, and facilitate the function of, a blockchain 408.

It should be noted that, while shown as a smartphone, a personal computer, and a server in FIG. 4, the user devices may be any type of computing device, including, but not limited to, a laptop computer, a tablet computer, a handheld computer, and/or other computing equipment (e.g., a server), including "smart," wireless, wearable, and/or mobile devices. It should be noted that embodiments describing the decentralized environment 400 performing a blockchain function may equally be applied to, and correspond to, an individual user device (e.g., user device 402, user device 404, and/or user device 406) performing the blockchain function. That is, the decentralized environment 400 may correspond to the user devices (e.g., user device 402, user device 404, and/or user device 406) collectively or individually.

Each of the user devices may be used by the system to conduct blockchain functions or operations and/or contribute to allocating and distributing cryptographic resources in response to an off-chain trigger or event upon request. As referred to herein, "blockchain functions" or "blockchain operations" may include any operations including and/or related to blockchains and blockchain technology. For example, blockchain functions or operations may include conducting transactions, querying a distributed ledger, generating additional blocks for a blockchain, transmitting communications-related NFTs, performing encryption/decryption, exchanging public/private keys, and/or other operations related to blockchains and blockchain technology. In some embodiments, a blockchain function or operation may include the creation, modification, detection, and/or execution of a smart contract or program stored on a blockchain. For example, a smart contract may include a program stored on a blockchain that is executed (e.g., automatically, without any intermediary's involvement or time loss) when one or more predetermined conditions are met. In some embodiments, a blockchain function may include the creation, modification, exchange, and/or review of a token (e.g., a digital blockchain-specific asset), including an NFT. An NFT may include a token that is associated with a good, a service, a smart contract, and/or other content that may be verified by, and stored using, blockchain technology.

In some embodiments, blockchain functions or operations may also include actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called Ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what may be consumed in running the smart contract. The system may terminate execution of the smart contract if the amount of gas consumed by computation exceeds the gas available in the blockchain function. For example, in Ethereum, gas includes a mechanism for enabling Turing-complete computation while limiting the resources that any smart contract and/or blockchain function may consume.

In some embodiments, gas may be obtained as part of a blockchain function or operation (e.g., a purchase) using a network-specific cryptocurrency (e.g., Ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 4, one or more user devices may include a digital wallet (e.g., cryptography-based storage application described above) used to perform blockchain functions or operations. For example, the digital wallet may include a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets, such as hot wallets and cold wallets. Hot wallets are connected to the Internet, while cold wallets are not. Most digital wallet holders hold both a hot wallet (e.g., residing on a computing device) and a cold wallet (residing on a device that is generally disconnected from a computing device and is not accessible until connected). Hot wallets are most often used to perform blockchain functions, while a cold wallet is generally used for managing a user account and may have no connection to the Internet.

One or more user devices may include a private key and a public key. In such cases, each pair includes a public key (e.g., which may be public) and a private key (e.g., which may be kept private). Key pairs may be generated using cryptographic algorithms (e.g., featuring one-way functions). Computing devices may then encrypt a message using an intended receiver's public key such that the encrypted message may be decrypted only with the receiver's corresponding private key. In some embodiments, a message may be used in combination with a private key to create a digital signature on the message. For example, the digital signature may be used to verify the authenticity of blockchain functions or operations. As an illustration, when conducting blockchain functions, the digital signature may be used to prove to every node in the system that it is authorized to conduct the blockchain functions.

For example, the decentralized environment 400 may include a plurality of nodes for the blockchain network. A node for a blockchain network is a computing device that may store a copy of some or all of the blockchain 408, creating a distributed ledger of transactions recorded thereon. Thus, each node includes a physical memory including bits that correspond to digital information within the blockchain 408, such as digital bit pattern representations (e.g., the bit pattern representation 112 described in relation to FIG. 1 above) stored in an application layer of the decentralized environment 400 (e.g., the application layer 106 described in relation to FIG. 1 above). Each node may also include an application or other software that records and/or monitors peer connections to other nodes and/or miners for the blockchain network. For example, a miner includes a node in a blockchain network that facilitates blockchain functions by verifying blockchain functions or operations on the blockchain, adding new blocks to the existing chain and/or ensuring that these additions are accurate. The nodes may continually record the state of the blockchain and respond to remote procedure requests for information about the blockchain.

Following an authentication of the blockchain function, the blockchain function may be authorized. For example, after the blockchain function is authenticated between the users, the decentralized environment 400 may authorize the blockchain function prior to adding it to the blockchain 408. Blockchain functions or operations may be added to the blockchain 408 via blockchain nodes. The blockchain may perform this (via blockchain nodes) based on a consensus within the blockchain network. For example, the decentralized environment 400 may queue operations in a mempool, or a collection of unprocessed transactions associated with a node of the decentralized environment 400, until a majority (or other metric) of the nodes in the community network determine that the blockchain function or operation is valid. In response to validation of the block, a blockchain node in the community network (e.g., a miner) may write the block to the blockchain and receive a reward (e.g., in a given cryptocurrency) as an incentive for validating the block. An aggregation of the individual mempools of each node combine to form a collective mempool for the community network.

To validate the blockchain function, a blockchain node may use one or more validation protocols and/or validation (or consensus) mechanisms. For example, a blockchain node may use a Proof of Work (POW) mechanism in which a user device must provide evidence that it performed computational work to validate a blockchain function, and thus this mechanism provides for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively or additionally, a blockchain node may use a Proof of Stake (POS) mechanism in which a user account (e.g., corresponding to a node on the blockchain network) is required to have, or "stake," a predetermined amount of tokens in order to be recognized as a validator in the blockchain network. In response to validation of the block, the block is added to blockchain 408, and the blockchain function is completed. For example, to add the blockchain function to blockchain 408, the successful node (e.g., the successful miner) encapsulates the blockchain function in a new block before committing it to the blockchain.

Computer System

Figure 5:
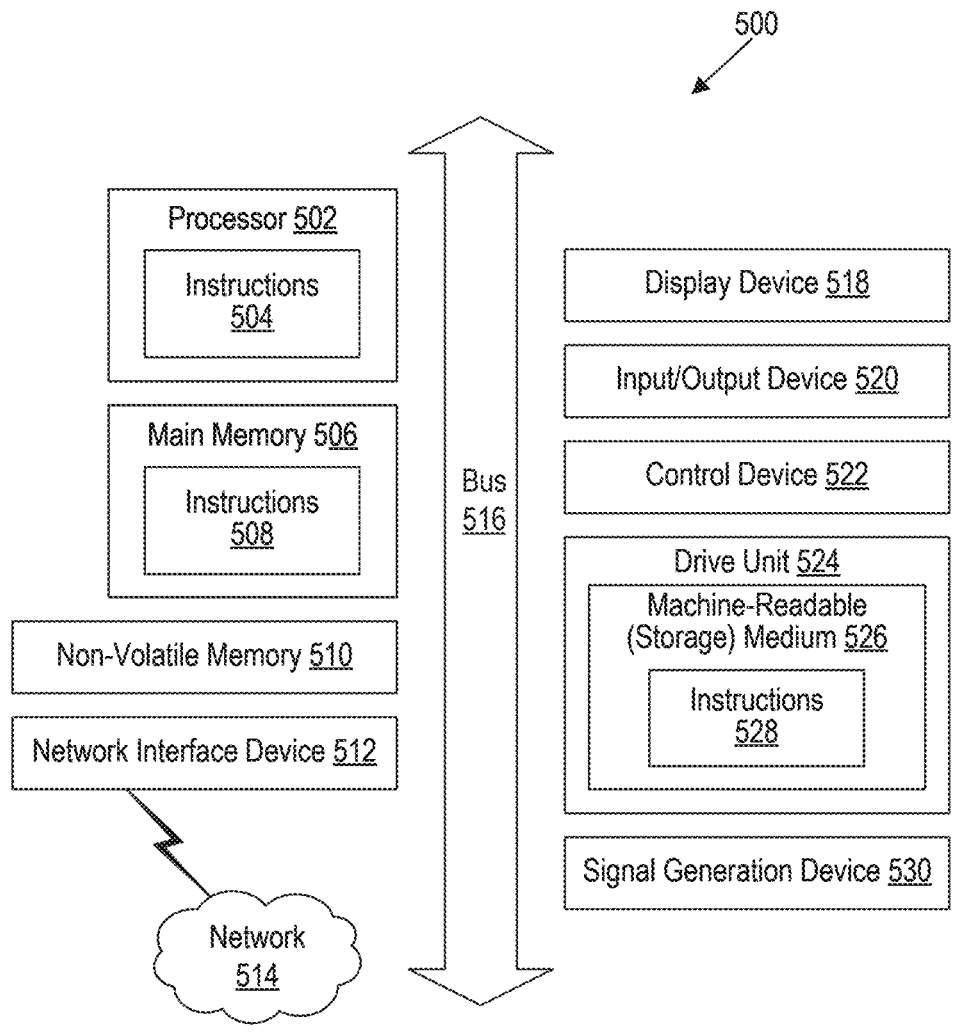
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer (SBC) system, or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable (storage) medium 526) can be local, remote, or distributed. Although shown as a single medium, the machine-readable (storage) medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable (storage) medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A method comprising:

encoding, based on a predefined schema, a data structure as a bit pattern representation, wherein the bit pattern representation is a numerically-based memory image of the data structure, and wherein the bit pattern representation is stored in one or more slots having a fixed bit size;

based on the fixed bit size and a total bit size of the bit pattern representation, determining a set of slot indices to map to portions of the bit pattern representation;

performing a storage operation including, for each slot index in the set of slot indices:

storing, in a smart contract, a mapping of a schema identifier associated with the predefined schema to the slot index, wherein the smart contract is associated with a blockchain, and storing, in the smart contract, a mapping of a particular portion of the bit pattern representation to the slot index, wherein the particular portion includes a first number of bits less than or equal to the fixed bit size;

receiving a request to determine an identity of an algorithm that generated a particular output, wherein the request includes a set of input values and a set of output values;

in response to receiving the request, decoding the bit pattern representation from data stored in the smart contract, thereby generating a set of data structure elements; and providing a response to the request by performing a zero-knowledge proof, wherein the zero-knowledge proof is based on the set of data structure elements, the set of input values, and the set of output values, and wherein the response includes the identity of the algorithm.

2. The method of claim 1, further comprising:

receiving, from a user associated with a cryptographic wallet address, the data structure;

storing, in the smart contract, a mapping of the schema identifier to the cryptographic wallet address;

for each slot index in the set of slot indices:

storing, in the smart contract, a mapping of the particular portion of the bit pattern representation to the cryptographic wallet address; and in response to receiving the request from the user, decoding the bit pattern representation by:

retrieving, using the cryptographic wallet address, the bit pattern representation and the schema identifier from the smart contract, and based on the schema identifier, applying the predefined schema to the bit pattern representation.

3. The method of claim 2, further comprising:

storing, in the smart contract, the cryptographic wallet address within a list of authorized operators, wherein the list of authorized operators indicates a set of cryptographic wallet addresses having permission to modify the bit pattern representation;

receiving a modification to the bit pattern representation, wherein the modification is associated with a second cryptographic wallet address; and upon determining that the second cryptographic wallet address is included in the set of cryptographic wallet addresses, modifying one or more mappings stored in the smart contract to reflect the modification.

4. The method of claim 3, further comprising:

upon performing the storage operation, recording a version identifier associated with the data structure to the blockchain; and upon modifying the one or more mappings, updating the version identifier to reflect the modification.

5. The method of claim 1, further comprising:

recording an event log to the blockchain, wherein the event log is an immutable record of the storage operation that includes the set of slot indices, thereby enabling a listener to reconstruct the data structure based on the event log.

6. The method of claim 5, further comprising:

generating a schema registry including the predefined schema and the schema identifier; and transmitting the schema registry to the listener, wherein the listener reconstructs the data structure by:

identifying the predefined schema based on the set of slot indices included in the event log and the schema registry, and applying the predefined schema to the portions of the bit pattern representation to which the set of slot indices are mapped.

7. The method of claim 1, wherein:

the data structure is a set of model weights, and the predefined schema is an algorithm for converting between individual weights and 32-bit portions of the bit pattern representation, the algorithm including shifting each weight from the set of model weights by a number of bit positions equal to 32 multiplied by an index of the weight within the set of model weights.

8. The method of claim 1, wherein:

the data structure includes an 8-bit opcode and a set of operands associated with the opcode, the total bit size is 256 bits, and the predefined schema is an algorithm that encodes the 8-bit opcode as a leftmost 8 bits of the bit pattern representation and the set of operands as a remaining 248 bits of the bit pattern representation by:

determining a bit size equal to 248 divided by a number of operands in the set of operands, and encoding each operand from the set of operands in the bit pattern representation using a second number of bits equal to the bit size.

9. The method of claim 1, wherein:

the data structure is a set of nucleotide bases from a genetic sequence, and the predefined schema is an algorithm for converting between individual nucleotide bases and 2-bit portions of the bit pattern representation.

10. The method of claim 1, wherein:

the data structure is a lexicographic sequence, and the predefined schema is an algorithm for converting between individual characters in the lexicographic sequence and 8-bit portions of the bit pattern representation.

11. A system comprising:

at least one hardware processor; and at least one non-transitory memory storing instructions, which, when executed by the at least one hardware processor, cause the system to:

encode, based on a predefined schema, a data structure as a bit pattern representation, wherein the bit pattern representation is a numerically-based memory image of the data structure, and wherein the bit pattern representation is stored in one or more slots having a fixed bit size;

based on the fixed bit size and a total bit size of the bit pattern representation, determine a set of slot indices to map to portions of the bit pattern representation;

perform a storage operation including, for each slot index in the set of slot indices:

storing, in a smart contract, a mapping of a schema identifier associated with the predefined schema to the slot index, wherein the smart contract is associated with a blockchain, and storing, in the smart contract, a mapping of a particular portion of the bit pattern representation to the slot index, wherein the particular portion includes a first number of bits less than or equal to the fixed bit size;

receive a request to determine an identity of an algorithm that generated a particular output, wherein the request includes a set of input values and a set of output values;

in response to receiving the request, decode the bit pattern representation from data stored in the smart contract, thereby generating a set of data structure elements; and provide a response to the request by performing a zero-knowledge proof, wherein the zero-knowledge proof is based on the set of data structure elements, the set of input values, and the set of output values, and wherein the response includes the identity of the algorithm.

12. The system of claim 11, further comprising instructions causing the system to:

receive, from a user associated with a cryptographic wallet address, the data structure;

storing, in the smart contract, a mapping of the schema identifier to the cryptographic wallet address;

for each slot index in the set of slot indices:

store, in the smart contract, a mapping of the particular portion of the bit pattern representation to the cryptographic wallet address; and in response to receiving the request from the user, decode the bit pattern representation by:

retrieving, using the cryptographic wallet address, the bit pattern representation and the schema identifier from the smart contract, and based on the schema identifier, applying the predefined schema to the bit pattern representation.

13. The system of claim 12, further comprising instructions causing the system to:

store, in the smart contract, the cryptographic wallet address within a list of authorized operators, wherein the list of authorized operators indicates a set of cryptographic wallet addresses having permission to modify the bit pattern representation;

receive a modification to the bit pattern representation, wherein the modification is associated with a second cryptographic wallet address; and upon determining that the second cryptographic wallet address is included in the set of cryptographic wallet addresses, modify one or more mappings stored in the smart contract to reflect the modification.

14. The system of claim 13, further comprising instructions causing the system to:

upon performing the storage operation, record a version identifier associated with the data structure to the blockchain; and upon modifying the one or more mappings, update the version identifier to reflect the modification.

15. The system of claim 11, further comprising instructions causing the system to:

record an event log to the blockchain, wherein the event log is an immutable record of the storage operation that includes the set of slot indices, thereby enabling a listener to reconstruct the data structure based on the event log.

16. The system of claim 15, further comprising instructions causing the system to:

generate a schema registry including the predefined schema and the schema identifier; and transmit the schema registry to the listener, wherein the listener reconstructs the data structure by:

identifying the predefined schema based on the set of slot indices included in the event log and the schema registry, and applying the predefined schema to the portions of the bit pattern representation to which the set of slot indices are mapped.

17. The system of claim 11, wherein:

the data structure is a set of model weights, and the predefined schema is an algorithm for converting between individual weights and 32-bit portions of the bit pattern representation, the algorithm including shifting each weight from the set of model weights by a number of bit positions equal to 32 multiplied by an index of the weight within the set of model weights.

18. The system of claim 11, wherein:

the data structure includes an 8-bit opcode and a set of operands associated with the opcode, the total bit size is 256 bits, and the predefined schema is an algorithm that encodes the 8-bit opcode as a leftmost 8 bits of the bit pattern representation and the set of operands as a remaining 248 bits of the bit pattern representation by:

determining a bit size equal to 248 divided by a number of operands in the set of operands, and encoding each operand from the set of operands in the bit pattern representation using a second number of bits equal to the bit size.

19. The system of claim 11, wherein:

the data structure is a set of nucleotide bases from a genetic sequence, and the predefined schema is an algorithm for converting between individual nucleotide bases and 2-bit portions of the bit pattern representation.

20. The system of claim 11, wherein:

the data structure is a lexicographic sequence, and the predefined schema is an algorithm for converting between individual characters in the lexicographic sequence and 8-bit portions of the bit pattern representation.

* * * * *